(12) United States Patent
Zhu et al.

(10) Patent No.: US 10,606,579 B2
(45) Date of Patent: Mar. 31, 2020

(54) MULTI-SYSTEM TERMINAL SYSTEM UPDATING METHOD, UPDATING DEVICE AND TERMINAL

(71) Applicant: Yulong Computer Telecommunication Scientific (Shenzhen) Co., Ltd., Shenzhen, Guangdong (CN)

(72) Inventors: Rui Zhu, Guangdong (CN); Long Chen, Guangdong (CN)

(73) Assignee: Yulong Computer Telecommunication Scientific (Shenzhen) Co., Ltd., Shenzhen (CN)

( * ) Notice: Subject to any disclaimer, the term of this patent is extended or adjusted under 35 U.S.C. 154(b) by 617 days.

(21) Appl. No.: 15/400,391

(22) Filed: Jan. 6, 2017

(65) Prior Publication Data

US 2017/0115982 A1    Apr. 27, 2017

Related U.S. Application Data

(63) Continuation-in-part of application No. PCT/CN2014/091812, filed on Nov. 20, 2014.

(51) Int. Cl.
    *G06F 9/44*     (2018.01)
    *G06F 8/65*     (2018.01)
    *G06F 9/445*    (2018.01)
    *G06F 9/4401*   (2018.01)

(52) U.S. Cl.
    CPC .............. *G06F 8/65* (2013.01); *G06F 9/4401* (2013.01); *G06F 9/445* (2013.01)

(58) Field of Classification Search
    CPC .... G06F 9/44502; G06F 9/44508; G06F 1/24; G06F 9/44526; G06F 15/177; G06F 9/44514; G06F 9/44523; G06F 11/1417; G06F 9/44505
    See application file for complete search history.

(56) References Cited

U.S. PATENT DOCUMENTS

2005/0132179 A1    6/2005  Glaum et al.
2009/0240846 A1*   9/2009  Keller, Jr. ............. G06F 16/178
                                                    710/19

(Continued)

FOREIGN PATENT DOCUMENTS

CN     103699421    *  1/2014   ............ G06F 9/445
CN     103699421 A     4/2014

(Continued)

*Primary Examiner* — Zahid Choudhury
(74) *Attorney, Agent, or Firm* — Young Basile Hanlon & MacFarlane, P.C.

(57) ABSTRACT

A system updating method for a multi-system terminal, a system updating device for a multi-system device, and a terminal include: during a process of creating a system updating file of the multi-system terminal, detecting whether data of a plurality of file partitions specified in the system updating file has changed; upon detecting that the data of at least one file partition of the plurality of file partitions has changed, establishing an identification file for updating a system corresponding to the at least one file partition in the system updating file; and upon receiving an instruction for updating a system of the multi-system terminal, updating a corresponding system of the multi-system terminal according to the identification file of the system updating file.

20 Claims, 8 Drawing Sheets

(56) References Cited

U.S. PATENT DOCUMENTS

2009/0313081 A1\* 12/2009 Beekhuis ........... G06Q 10/0637
710/1
2011/0320794 A1\* 12/2011 Yang ................... G06F 11/1004
713/1

FOREIGN PATENT DOCUMENTS

| CN | 104133700 A | 11/2014 |
| WO | 2010031304 A1 | 3/2010 |

\* cited by examiner

| BOOTLOADER | BOOT_UNSAFE | BOOT_SAFE | SYSTEM_UNSAFE | SYSTEM_SAFE | DATA_UNSAFE | DATA_SAFE | RECOVERY |

FIG. 3

MULTI-SYSTEM TERMINAL SYSTEM UPDATING METHOD, UPDATING DEVICE AND TERMINAL

CROSS-REFERENCE TO RELATED APPLICATION(S)

This application is a continuation in part of International Patent Application PCT No. PCT/CN2014/091812, filed on Nov. 20, 2014, entitled "MULTI-SYSTEM TERMINAL SYSTEM UPDATING METHOD, UPDATING DEVICE AND TERMINAL", which is hereby incorporated by reference in its entirety.

TECHNICAL FIELD

The present disclosure relates to the technical field of terminal system, and in particular, to a system updating method for a multi-system terminal, a system updating device for a multi-system terminal, and a terminal.

BACKGROUND

With the development of smart terminal technology, the pertinent art provides terminals having multiple systems. For example, for a terminal having two systems, one system is used as a safe system, and the other system is used as a normal system.

Presently, many manners of running dual systems of a terminal exist. For example, each time just one system is run, and when switching the systems, the terminal needs to be restarted. Or the two systems are run simultaneously, and a certain manner can be used for switching the two systems without restarting the terminal. During a process of using the dual-system terminal, a problem of updating systems of the multi-system terminal inevitably occurs. However, in the pertinent art, a feasible system updating solution for the multi-system terminal is not proposed.

Therefore, how to update systems of the multi-system terminal has become a technical problem which needs to be solved instantly.

SUMMARY

Based on at least one of the above technical problems, the present disclosure provides a new system updating solution for a multi-system terminal. By means of the present disclosure, any system of the multi-system terminal can be simply updated, a high applicability can be obtained, and the operation and control is easy, thereby improving efficiency of system updating.

In view of this, in the present disclosure, a system updating method for a multi-system terminal is provided. The method comprises: during a process of creating a system updating file of the multi-system terminal, detecting whether data of a plurality of file partitions specified in the system updating file has changed; upon detecting that the data of at least one file partition of the plurality of file partitions has changed, establishing an identification file for updating a system corresponding to the at least one file partition in the system updating file; and upon receiving an instruction for updating a system of the multi-system terminal, updating a corresponding system of the multi-system terminal according to the identification file of the system updating file.

In the technical solution, when updating a system of the terminal, what is needed to do is to add a patch file to a corresponding file partition of the system updating file. Therefore, during the process of creating the system updating file, when it is detected that the data of the multiple file partitions specified in the system updating file has changed, the multi-system terminal establishes an identifier file for updating a corresponding system, thus the system to be updated can be determined during the process of creating the patch file. Accordingly, when the multi-system terminal performs an operation of system updating, a corresponding system of the multi-system terminal can be updated just according to the identifier file of the system updating file, and a user does not need to participate in the system updating process to inform the terminal of the system to be updated, accordingly, any system of the multi-system terminal can be easily updated, a high applicability can be obtained, the operation and control is easy, thereby improving efficiency of system updating.

In the above technical solution, preferably, the plurality of file partitions comprises a partition of a boot program for booting the loading of a kernel of the multi-system terminal. Detecting whether the data of the plurality of file partitions specified in the system updating file has changed, and establishing the identifier file comprises: detecting whether the data of the partition of the boot program for booting the loading of the kernel of the multi-system terminal has changed; and establishing the identifier file for updating all systems of the multi-system terminal upon detecting that the data of the partition of the boot program for booting the loading of the kernel of the multi-system terminal has changed.

In the technical solution, the partition of the boot program for booting the loading of the kernel of the terminal is a partition which needs to be firstly loaded when the terminal is started. If the data of the partition has changed, it indicates that a system loading strategy of the terminal has changed, thus each of the systems of the terminal needs to be updated. For example, for an embedded system, e.g., the Android system, the boot program for booting the loading of the kernel of the terminal is bootloader, the partition of the boot program is an aboot partition. When it is detected that the data of the aboot partition of the system updating file has changed, it is determined that all of the systems of the terminal need to be updated.

In the above technical solution, preferably, the plurality of file partitions further comprise partitions of boot programs each for booting the starting of one of the systems of the multi-system terminal, and system partitions each corresponding to one of the systems. Detecting whether the data of the plurality of file partitions specified in the system updating file has changed, and establishing the identifier file comprises: detecting whether the data of the file partitions of the boot programs each for booting the starting of one of the systems of the multi-system terminal has changed, and detecting whether the data of the system partitions each corresponding to one of the systems has changed; and upon detecting that the data of the partition of the boot program for booting the loading of the kernel of the multi-system terminal is unchanged, and detecting that the data of the partition of the boot program for booting the starting of one of the systems of the multi-system terminal has changed, and/or upon detecting that the data of the system partition corresponding to the one of the systems has changed, establishing an identifier file for updating the one of the systems.

In the technical solution, the partition of the boot program for booting the starting of one of the systems and the system partition corresponding to the one of the systems correspond to the one of the systems of the terminal. Therefore, upon detecting that the data of the partition of the boot program for booting the one of the systems has changed, and/or upon detecting that the data of the system partition corresponding to the one of the systems has changed, it is determined that the one of the systems needs to be updated. For example, in the Android system, the partition of the boot program for booting the starting of one of the systems is the boot partition, and the system partition corresponding to one of the systems is the system partition. Upon detecting that in the system updating file the data of the boot partition corresponding to a certain system has changed, and/or upon detecting that in the system updating file the data of the system partition corresponding to the certain system has changed, it is determined that the certain system needs to be updated.

In the above technical solution, preferably, upon receiving the instruction for updating a system of the multi-system terminal, the method further comprises: parsing the system updating file to obtain the identifier file of the system updating file.

In the technical solution, after creating the system updating file, the system updating file is compressed. Thus, when determining whether the system updating file includes the identifier file for updating a system of the terminal, the system updating file needs to be parsed.

In the above technical solution, preferably, whether the data of each of the plurality of file partitions has changed is determined by detecting whether each of the plurality of file partitions comprises a file having a specified suffix.

Specifically, in the Android system, if the data of a certain partition of the system updating file has changed, a corresponding "*.P" patch file is created in the certain partition, thus whether the data of the file partition has changed can be determined by detecting whether the file partition includes a file having the specified suffix.

In the above technical solution, preferably, updating one of the systems of the multi-system terminal comprises: verifying in the system updating file files of the system partition of the one of the systems, and verifying in the system updating file the data of the partition of the boot program for booting the starting of the one of the systems; and after the verification, writing the files of the system partition of the one of the systems in the system updating file and the data of the partition of the boot program for booting the starting of the one of the systems in the system updating file into corresponding file partitions of the multi-system terminal respectively.

The system starting solution of the multi-system terminal of the present disclosure includes following.

According to an implementation of the present disclosure, upon receiving an instruction for starting all of the systems of the multi-system terminal, the partitions of the boot programs each for booting the starting of one of the systems of the multi-system terminal are loaded via the boot program for booting the loading of the kernel of the multi-system terminal. Scripts of init processes each corresponding to one of the systems are parsed via the init processes started by the kernel of the multi-system terminal, so as to create file systems each corresponding to one of the systems, and start system processes each corresponding to one of the systems, thereby realizing loading of the system partitions each corresponding to one of the systems.

Specifically, for a dual-system terminal, one system is defined as an unsafe system, and another system is defined as a safe system. After the terminal is powered on, the boot_unsafe partition and the boot_safe partition are simultaneously loaded by the bootloader of the terminal, and the init processes are started to respectively parse the scripts of the init_unsafe and init_safe, so as to create the file systems each corresponding to one of the systems, start the system processes, and so on. Therefore, the system_unsafe partition and the system_safe partition can be loaded to finish the starting of the dual-system terminal.

According to another aspect of the present disclosure, a system updating device for a multi-system terminal is further provided. The device comprises: a detecting unit configured to detect whether data of a plurality of file partitions specified in a system updating file has changed during a process of creating the system updating file of the multi-system terminal, an establishing unit configured to establish an identification file for updating a system corresponding to at least one file partition of the plurality of file partitions in the system updating file when the detecting unit detects that the data of the at least one file partition has changed, and a system updating unit configured to update a corresponding system of the multi-system terminal according to the identification file of the system updating file upon receiving an instruction for updating a system of the multi-system terminal.

In the technical solution, when updating a system of the terminal, what is needed to do is to add a patch file to a corresponding file partition of the system updating file. Therefore, during the process of creating the system updating file, when it is detected that the data of the multiple file partitions specified in the system updating file has changed, the establishing unit establishes an identifier file for updating a corresponding system, thus the system to be updated can be determined during the process of creating the patch file. Accordingly, when the system updating unit performs an operation of system updating, a corresponding system of the multi-system terminal can be updated just according to the identifier file of the system updating file, and a user does not need to participate in the system updating process to inform the terminal of the system to be updated, accordingly, any system of the multi-system terminal can be easily updated, a high applicability can be obtained, the operation and control is easy, thereby improving efficiency of system updating.

In the above technical solution, preferably, the plurality of file partitions comprises a partition of a boot program for booting the loading of a kernel of the multi-system terminal. The detecting unit is configured to detect whether the data of the partition of the boot program for booting the loading of the kernel of the multi-system terminal has changed. The establishing unit is configured to establish the identifier file for updating all systems of the multi-system terminal when the detecting unit detects that the data of the partition of the boot program for booting the loading of the kernel of the multi-system terminal has changed.

In the technical solution, the partition of the boot program for booting the loading of the kernel of the terminal is a partition which needs to be firstly loaded when the terminal is started. When the data of the partition has changed, it indicates that a system loading strategy of the terminal has changed, thus each of the systems of the terminal needs to be updated. For example, for an embedded system, e.g., the Android system, the boot program for booting the loading of the kernel of the terminal is bootloader, the partition of the boot program is an aboot partition. When it is detected that the data of the aboot partition of the system updating file has changed, it is determined that all of the systems of the terminal need to be updated.

In the above technical solution, preferably, the plurality of file partitions further comprise partitions of boot programs each for booting the starting of one of the systems of the multi-system terminal, and system partitions each corresponding to one of the systems. The detecting unit is further configured to detect whether the data of the partitions of the boot programs each for booting the starting of one of the systems of the multi-system terminal has changed, and detect whether the data of the system partitions each corresponding to one of the systems has changed. The establishing unit is further configured to establish an identifier file for updating one of the systems when the detecting unit detects that the data of the partition of the boot program for booting the loading of the kernel of the multi-system terminal is unchanged, and detects that the data of the partition of the boot program for booting the starting of the one of the systems of the multi-system terminal has changed, and/or detects that the data of the system partition corresponding to the one of the systems has changed.

In the technical solution, the partition of the boot program for booting the starting of one of the systems and the system partition corresponding to the one of the systems correspond to the one of the systems of the terminal. Therefore, upon detecting that the data of the partition of the boot program for booting one of the systems has changed, and/or upon detecting that the data of the system partition corresponding to the one of the systems has changed, it is determined that the one of the systems needs to be updated. For example, in the Android system, the partition of the boot program for booting the starting of one of the systems is the boot partition, and the system partition corresponding to one of the systems is the system partition. Upon detecting that in the system updating file the data of the boot partition corresponding to a certain system has changed, and/or upon detecting that in the system updating file the data of the system partition corresponding to the certain system has changed, it is determined that the certain system needs to be updated.

In the above technical solution, preferably, the device further comprises a first parsing unit configured to parse the system updating file to obtain the identifier file of the system updating file.

In the technical solution, after creating the system updating file, the system updating file is compressed. Thus, when determining whether the system updating file includes the identifier file for updating a system of the terminal, the system updating file needs to be parsed.

In the above technical solution, preferably, the detecting unit is configured to detect whether the data of each of the plurality of file partitions has changed by detecting whether each of the plurality of file partitions comprises a file having a specified suffix.

Specifically, in the Android system, if the data of a certain partition of the system updating file has changed, a corresponding "*.P" patch file is created in the certain partition, thus whether the data of the file partition has changed can be determined by detecting whether the file partition includes a file having the specified suffix.

In the above technical solution, preferably, the system updating unit comprises: a verifying unit configured to verify in the system updating file files of the system partition of the one of the systems, and verifying in the system updating file the data of the partition of the boot program for booting the starting of the one of the systems; and a writing unit configured to write the files of the system partition of the one of the systems in the system updating file and the data of the partition of the boot program for booting the starting of the one of the systems in the system updating file into corresponding file partitions of the multi-system terminal respectively after the verifying unit finishes the verification.

The system starting solution of the multi-system of the present disclosure includes following.

According to an implementation of the present disclosure, the system updating device for a multi-system terminal further includes: a loading unit configured to load the partitions of the boot programs each for booting the starting of one of the systems of the multi-system terminal via the boot program for booting the loading of the kernel of the multi-system terminal upon receiving an instruction for starting all of the systems of the multi-system terminal, and a second parsing unit configured to parse scripts of init processes each corresponding to one of the systems via the init processes started by the kernel of the multi-system terminal, so as to create file systems each corresponding to one of the systems, and start system processes each corresponding to one of the systems, thereby realizing loading of the system partitions each corresponding to one of the systems.

Specifically, for a dual-system terminal, one system is defined as an unsafe system, and another system is defined as a safe system. After the terminal is powered on, the boot_unsafe partition and the boot_safe partition are simultaneously loaded by the bootloader of the terminal, and the init processes are started to respectively parse the scripts of the init_unsafe and init_safe, so as to create the file systems each corresponding to one of the systems, start the system processes, and so on. Therefore, the system_unsafe partition and the system_safe partition can be loaded to finish the starting of the dual-system terminal.

According to yet another aspect of the present disclosure, a terminal is provided. The terminal includes a plurality of systems, and a system updating device for a multi-system terminal described in any of the above technical solutions.

By means of the above technical solution, any system of the multi-system terminal can be updated easily, a high applicability can be obtained, the operation and control is easy, thereby improving efficiency of system updating.

BRIEF DESCRIPTION OF THE DRAWINGS

FIG. 3 is a schematic view of a file partition structure of a terminal in accordance with an implementation of the present disclosure.

DETAILED DESCRIPTION

To understand the above-mentioned purposes, features and advantages of the present disclosure more clearly, the present disclosure will be further described in detail below in combination with the accompanying drawings and the specific implementations. It should be noted that, the implementations of the present application and the features in the implementations may be combined with one another without conflicts.

Many specific details will be described below for sufficiently understanding the present disclosure. However, the present disclosure may also be implemented by adopting other manners different from those described herein. Accordingly, the protection scope of the present disclosure is not limited by the specific implementations disclosed below.

Figure 1:
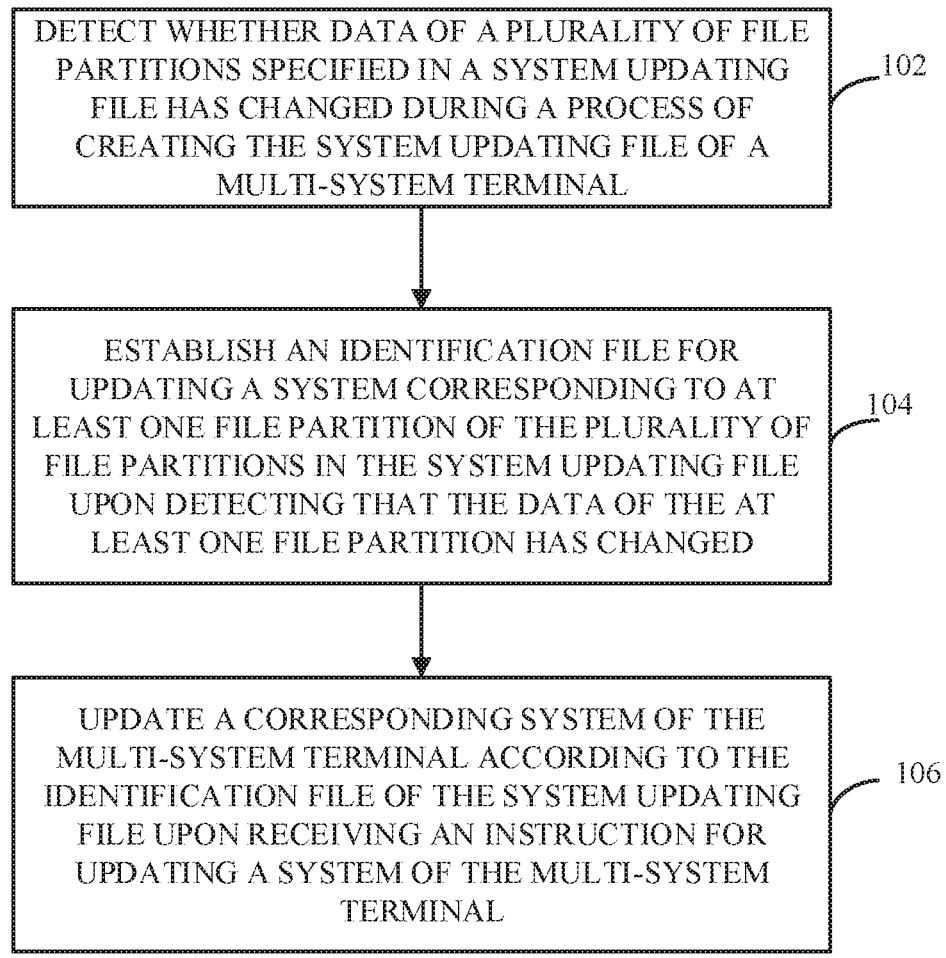
FIG. 1 is a schematic flow chart of a system updating method for a multi-system terminal in accordance with an implementation of the present disclosure.

FIG. 1 is a schematic flow chart of a system updating method for a multi-system terminal in accordance with an implementation of the present disclosure.

As illustrated by FIG. 1, a system updating method for a multi-system terminal in accordance with an implementation of the present disclosure includes: step 102, during a process of creating a system updating file of the multi-system terminal, detecting whether data of multiple file partitions specified in the system updating file has changed; step 104, upon detecting that the data of at least one file partition of the multiple file partitions has changed, establishing an identification file for updating a system corresponding to the at least one file partition in the system updating file; step 106, upon receiving an instruction for updating a system of the multi-system terminal, updating a corresponding system of the multi-system terminal according to the identification file of the system updating file.

In the technical solution, when updating a system of the terminal, what is needed to do is to add a patch file to a corresponding file partition of the system updating file. Therefore, during the process of creating the system updating file, when it is detected that the data of the multiple file partitions specified in the system updating file has changed, the multi-system terminal establishes an identifier file for updating a corresponding system, thus the system to be updated can be determined during the process of creating the patch file. Accordingly, when the multi-system terminal performs an operation of system updating, a corresponding system of the multi-system terminal can be updated just according to the identifier file of the system updating file, and a user does not need to participate in the system updating process to inform the terminal of the system to be updated, accordingly, any system of the multi-system terminal can be easily updated, a high applicability can be obtained, the operation and control is easy, thereby improving efficiency of system updating.

In the above technical solution, preferably, the multiple file partitions include a partition of a boot program for booting the loading of a kernel of the terminal. Detecting whether the data of the multiple file partitions specified in the system updating file has changed, and creating the identifier file specifically includes: detecting whether the data of the partition of the boot program for booting the loading of the kernel of the terminal has changed, and establishing an identifier file for updating all of systems of the terminal upon detecting that the data of the partition of the boot program for booting the loading of the kernel of the terminal has changed.

In the technical solution, the partition of the boot program for booting the loading of the kernel of the terminal is a partition which needs to be firstly loaded when the terminal is started. If the data of the partition has changed, it indicates that a system loading strategy of the terminal has changed, thus each of the systems of the terminal needs to be updated. For example, for an embedded system, e.g., the Android system, the boot program for booting the loading of the kernel of the terminal is bootloader, the partition of the boot program is an aboot partition. When it is detected that the data of the aboot partition of the system updating file has changed, it is determined that all of the systems of the terminal needs to be updated.

In the above technical solution, preferably, the multiple file partitions further include partitions of boot programs each for booting the starting of one of the systems of the terminal, and system partitions each corresponding to one of the systems. Detecting whether the data of the multiple file partitions specified in the system updating file has changed, and establishing the identifier file specifically includes: detecting whether data of the partitions of the boot programs each for booting the starting of one of the systems of the terminal has changed, and detecting whether data of the system partitions each corresponding to one of the systems has changed; upon detecting that the data of the partition of the boot program for booting the loading of the kernel of the terminal is not changed, and detecting that the data of the partition of the boot program for booting the starting of one of the systems of the terminal has changed, and/or upon detecting that the data of the system partition corresponding to the one of the systems has changed, establishing an identifier file for updating the one of the system.

In the technical solution, the partition of the boot program for booting the starting of one of the systems and the system partition corresponding to the one of the systems correspond to the one of the systems of the terminal. Therefore, upon detecting that the data of the partition of the boot program for booting one of the systems has changed, and/or upon detecting that the data of the system partition corresponding to the one of the systems has changed, it is determined that the one of the systems needs to be updated. For example, in the Android system, the partition of the boot program for booting the starting of one of the systems is the boot partition, and the system partition corresponding to one of the systems is the system partition. Upon detecting that in the system updating file the data of the boot partition corresponding to a certain system has changed, and/or upon detecting that in the system updating file the data of the system partition corresponding to the certain system has changed, it is determined that the certain system needs to be updated.

In the above technical solution, preferably, upon receiving the instruction for updating a system of the multi-system terminal, the method further includes parsing the system updating file to obtain the identifier file of the system updating file.

In the technical solution, after creating the system updating file, the system updating file is compressed is compressed. Thus, when determining whether the system updating file includes the identifier file for updating a system of the terminal, the system updating file needs to be parsed.

In the above technical solution, preferably, whether the data of each file partition has changed is determined by detecting whether each of the multiple file partitions includes a file having a specified suffix.

Specifically, in the Android system, if the data of a certain partition of the system updating file has changed, a corresponding "*.P" patch file is created in the certain partition, thus whether the data of the file partition has changed can be determined by detecting whether the file partition includes a file having the specified suffix.

In the above technical solution, preferably, the step of updating the one of the systems of the multi-system terminal includes: verifying in the system updating file files of the system partition of the one of the systems and verifying in the system updating file the data of the partition of the boot program for booting the starting of the one of the systems; after the verification, writing the files of the system partition of the one of the systems in the system updating file and the data of the partition of the boot program for booting the starting of the one of the systems in the system updating file into corresponding file partitions of the terminal respectively.

The system starting solution of the multi-system terminal of the present disclosure includes following.

According to an implementation of the present disclosure, upon receiving the instruction for starting all of the systems of the terminal, the partitions of the boot programs each for booting the starting of one of the systems of the terminal are loaded via the boot program for booting the loading of the kernel of the terminal, and scripts of init processes each corresponding to one of the systems are parsed via the init processes started by the kernel of the terminal, so as to create the file systems each corresponding to one of the systems, and start the system processes each corresponding to one of the systems, thereby realizing the loading of the system partitions each corresponding to one of the systems.

Specifically, for a dual-system terminal, one system is defined as an unsafe system, and another system is defined as a safe system. After the terminal is powered on, the boot_unsafe partition and the boot_safe partition are simultaneously loaded by the bootloader of the terminal, and the init processes are started to respectively parse the scripts of the init_unsafe and init_safe, so as to create the file systems each corresponding to one of the systems, start the system processes, and so on. Therefore, the system_unsafe partition and the system_safe partition can be loaded to finish the starting of the dual-system terminal.

Figure 2:
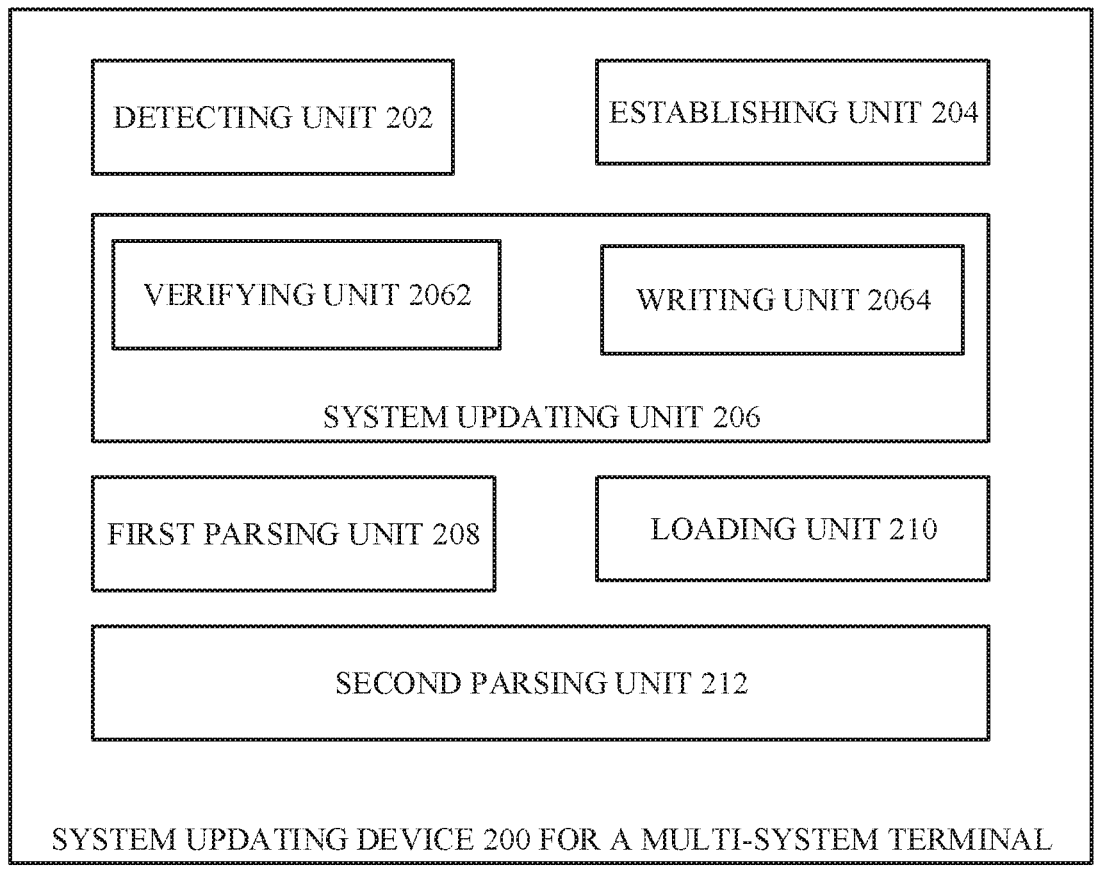
FIG. 2 is a schematic function block diagram of a system updating device for a multi-system terminal in accordance with an implementation of the present disclosure.

FIG. 2 is a schematic block diagram of a system updating device for a multi-system terminal in accordance with an implementation of the present disclosure.

As illustrated by FIG. 2, a system updating device 200 for a multi-system terminal in accordance with an implementation of the present disclosure includes a detecting unit 202 configured to detect whether data of a plurality of file partitions specified in a system updating file has changed during a process of creating the system updating file of the multi-system terminal, an establishing unit 204 configured to establish an identification file for updating a system corresponding to at least one file partition of the plurality of file partitions in the system updating file upon detecting that the data of the at least one file partition has changed, and a system updating unit 206 configured to update a corresponding system of the multi-system terminal according to the identification file of the system updating file upon receiving an instruction for updating a system of the multi-system terminal.

In the technical solution, when updating a system of the terminal, what is needed to do is to add a patch file to a corresponding file partition of the system updating file. Therefore, during the process of creating the system updating file, when it is detected that the data of the multiple file partitions specified in the system updating file has changed, the establishing unit 204 establishes an identifier file for updating a corresponding system, thus the system to be updated can be determined during the process of creating the patch file. Accordingly, when the system updating unit 206 performs an operation of system updating, a corresponding system of the multi-system terminal can be updated just according to the identifier file of the system updating file, and a user does not need to participate in the system updating process to inform the terminal of the system to be updated, accordingly, any system of the multi-system terminal can be easily updated, a high applicability can be obtained, the operation and control is easy, thereby improving efficiency of system updating.

In the above technical solution, preferably, the multiple file partitions include a partition of a boot program for booting the loading of a kernel of the terminal. The detecting unit 202 is configured to detect whether the data of the partition of the boot program for booting the loading of the kernel of the terminal has changed. The establishing unit 204 is configured to establish an identifier file for updating all of systems of the terminal when the detecting unit 202 detects that the data of the partition of the boot program for booting the loading of the kernel of the terminal has changed.

In the technical solution, the partition of the boot program for booting the loading of the kernel of the terminal is a partition which needs to be firstly loaded when the terminal is started. When the data of the partition has changed, it indicates that a system loading strategy of the terminal has changed, thus each of the systems of the terminal needs to be updated. For example, for an embedded system, e.g., the Android system, the boot program for booting the loading of the kernel of the terminal is bootloader, the partition of the boot program is an aboot partition. When it is detected that the data of the aboot partition of the system updating file has changed, it is determined that all of the systems of the terminal need to be updated.

In the above technical solution, preferably, the multiple file partitions further include partitions of boot programs each for booting the starting of one of the systems of the terminal, and system partitions each corresponding to one of the systems. The detecting unit 202 is further configured to detect whether data of the partitions of the boot programs each for booting the starting of one of the systems of the terminal has changed, and detect whether data of the system partitions each corresponding to one of the systems has changed. The establishing unit 204 is further configured to establish an identifier file for updating one of the systems when the detecting unit 202 detects that the data of the partition of the boot program for booting the loading of the kernel of the terminal is not changed, and detects that the data of the partition of the boot program for booting the starting of the one of the systems of the terminal has changed, and/or detects that the data of the system partition corresponding to the one of systems has changed.

In the technical solution, the partition of the boot program for booting the starting of one of the systems and the system partition corresponding to the one of the systems correspond to the one of the systems of the terminal. Therefore, upon detecting that the data of the partition of the boot program for booting one of the systems has changed, and/or upon detecting that the data of the system partition corresponding to the one of the systems has changed, it is determined that the one of the systems needs to be updated. For example, in the Android system, the partition of the boot program for booting the starting of one of the systems is the boot partition, and the system partition corresponding to one of the systems is the system partition. Upon detecting that in the system updating file the data of the boot partition corresponding to a certain system has changed, and/or upon detecting that in the system updating file the data of the system partition corresponding to the certain system has changed, it is determined that the certain system needs to be updated.

In the above technical solution, preferably, the system updating device 200 further includes a first parsing unit 208 configured to parse the system updating file to obtain the identifier file of the system updating file.

In the technical solution, after creating the system updating file, the system updating file is compressed. Thus, when determining whether the system updating file includes the identifier file for updating a system of the terminal, the system updating file needs to be parsed.

In the above technical solution, preferably, the detecting unit 202 is configured to determine whether the data of each file partition has changed by detecting whether each of the multiple file partitions includes a file having a specified suffix.

Specifically, in the Android system, when the data of a certain partition of the system updating file has changed, a corresponding "*.P" patch file is created in the certain partition, thus whether the data of the file partition has changed can be determined by detecting whether the file partition includes a file having the specified suffix.

In the above technical solution, preferably, the system updating unit 206 includes: a verifying unit 2062 configured to verify in the system updating file files of the system partition of the one of the systems and verify in the system updating file the data of the partition of the boot program for booting the starting of the one of the systems, and a writing unit 2064 configured to write the files of the system partition of the one of the systems in the system updating file and the data of the partition of the boot program for booting the starting of the one of the systems in the system updating file into corresponding file partitions of the terminal respectively after the verifying unit 2062 finishes the verification.

The system starting solution of the multi-system terminal of the present disclosure includes following.

According to an implementation of the present disclosure, the system updating device 200 for a multi-system terminal further includes a loading unit 210 configured to load the partitions of the boot programs each for booting the starting of one of the systems of the terminal via the boot program for booting the loading of the kernel of the terminal upon receiving an instruction for starting all of the systems of the terminal, and a second parsing unit 212 configured to parse scripts of init processes each corresponding to one of the systems via the init processes started by the kernel of the terminal, so as to create the file systems each corresponding to one of the systems, and start the system processes each corresponding to one of the systems, thereby realizing the loading of the system partitions each corresponding to one of the systems.

Specifically, for a dual-system terminal, one system is defined as an unsafe system, and another system is defined as a safe system. After the terminal is powered on, the boot_unsafe partition and the boot_safe partition are simultaneously loaded by the bootloader of the terminal, and the init processes are started to respectively parse the scripts of the init_unsafe and init_safe, so as to create the file systems each corresponding to one of the systems, start the system processes, and so on. Therefore, the system_unsafe partition and the system_safe partition can be loaded to finish the starting of the dual-system terminal.

The present disclosure further provides a terminal which includes multiple systems and the system updating device 200 for the multi-system terminal illustrated by FIG. 2.

Take the dual-system terminal for an example, the following implementations will specifically illustrates the technical solution of the present disclosure in combination with FIGS. 3-7.

According to an implementation of the present disclosure, two systems of the dual-system terminal can be defined as a safe system and an unsafe system.

Wherein, the terminal can simultaneously run the two systems. The division of the system partitions is illustrated by FIG. 3. After the terminal is powered on, the bootloader simultaneously loads the boot-unsafe partition and the boot-safe partition, and starts init processes to respectively parse scripts of the init-unsafe and init-safe, so as to create file systems, start system processes, and so on. The system-unsafe partition and the system-safe partition can be loaded to finish the starting process of the dual-system terminal. The Data-unsafe partition and Data-safe partition are the data partitions for storing two systems, the recovery partition is the system backup file partition used for recovering a system.

When updating a system, the data of the aboot partition (the partition for storing the bootloader), the boot partition, and the system partition are updated. The updating is realized by installing a difference packet recording difference between an old version and a new version. Therefore, during updating a system, creating the difference packet is very important. In an actual updating process, a corresponding difference packet (that is, an updating file packet) can be created according to needs.

According to an implementation of the present disclosure, during a process of creating a difference packet, when it is detected that the data of the partition of the bootloader has changed, an identifier file update-both is created in the difference packet to indicate that the two systems need to be updated. When it is detected that the data of the boot-unsafe partition and/or system-unsafe partition has changed, an identifier file update-unsafe is created in the difference packet to indicate that the normal system needs to be updated. When it is detected that the data of the boot-safe partition and/or system-safe partition has changed, an identifier file update-safe is created in the difference packet to indicate that the safe system needs to be updated. That is, in root directory of the created difference packet (updating packet) the identifier file update-both, update-unsafe, or update-safe exists. Wherein, whether the data of a certain partition has changed can be determined by detecting whether a .p patch file exists in the certain partition. When the .p patch file exists in the certain partition, it is determined that the data of the partition has changed, otherwise, it is determined that the data of the partition is unchanged.

Figure 4:
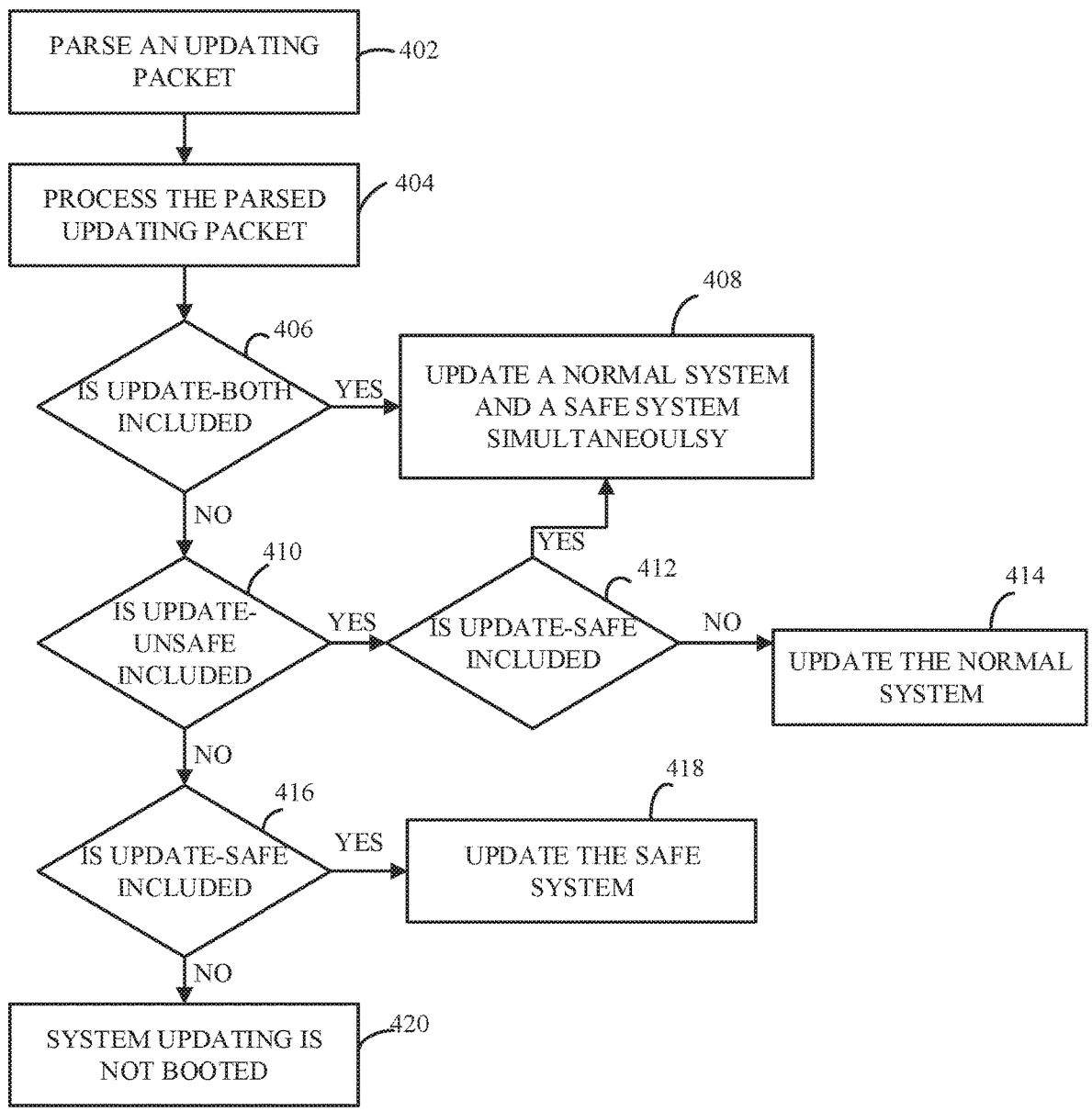
FIG. 4 is a schematic flow chart of a system updating method of a dual-system terminal in accordance with an implementation of the present disclosure.

Wherein, a system updating process of a dual-system terminal provided by the present disclosure is illustrated by FIG. 4.

As illustrated by FIG. 4, a system updating method of a dual-system terminal in accordance with an implementation of the present disclosure includes following.

Step 402, an updating packet is parsed.

Step 404, the parsed updating packet is processed to determine an identifier file of the updating packet.

Step 406, whether the parsed updating packet includes update-both is determined. If yes, step 408 is executed, otherwise, step 410 is executed.

Step 408, when it is determined that the parsed updating packet includes update-both, a normal system and a safe system are booted to be updated simultaneously.

Step 410, when it is determined that the parsed updating packet does not include update-both, whether the parsed updating packet includes update-unsafe is determined. If yes, step 412 is executed, otherwise, step 416 is executed.

Step 412, when it is determined that the parsed updating packet includes update-unsafe, whether the parsed updating packet includes update-safe is determined. If yes, step 408 is executed, otherwise, step 414 is executed.

Step 414, when it is determined that the parsed updating packet includes update-unsafe but does not include update-safe, the normal system is booted to be updated.

Step 416, when it is determined that the parsed updating packet includes update-unsafe, whether the parsed updating packet includes update-safe is determined. If yes, step 418 is executed, otherwise, step 420 is executed.

Step 418, when it is determined that the parsed updating packet does not include update-unsafe but includes update-safe, the safe system is booted to be updated.

Step 420, when it is determined that the parsed updating packet does not include update-both, update-unsafe, and update-safe, system updating is not booted.

Figure 5:
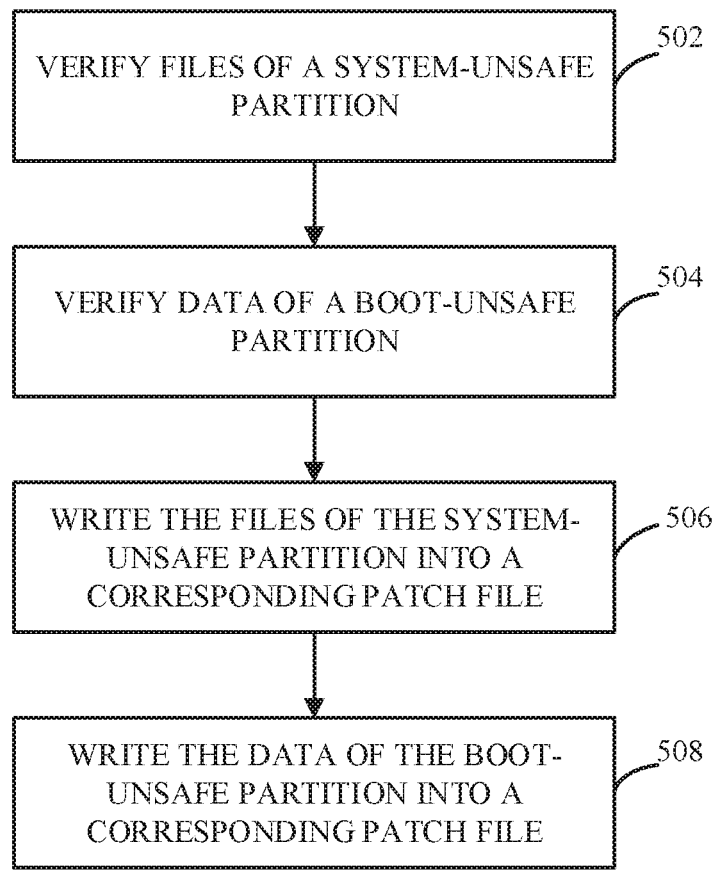
FIG. 5 is a schematic flow chart of an updating method of a normal system in accordance with an implementation of the present disclosure.

Wherein, a method for updating the normal system is illustrated by FIG. 5.

As illustrated by FIG. 5, the updating method of the normal system in accordance with an implementation of the present disclosure includes following.

Step 502, files of the system-unsafe partition are verified.

Step 504, data of the boot-unsafe partition is verified.

Step 506, the files of the system-unsafe partition are written into a corresponding patch file.

Step 508, the data of the boot-unsafe partition is written into a corresponding patch file.

Figure 6:
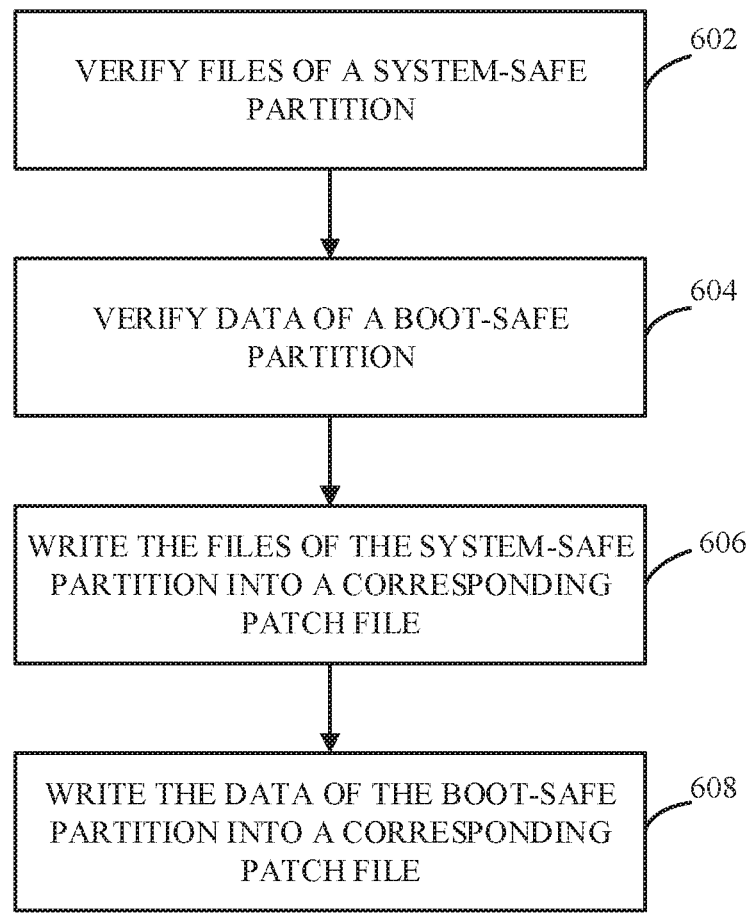
FIG. 6 is a schematic flow chart of an updating method of a safe system in accordance with an implementation of the present disclosure.

Wherein, a method for updating the normal system is illustrated by FIG. 6.

As illustrated by FIG. 6, the updating method of the safe system in accordance with an implementation of the present disclosure includes following.

Step 602, files of the system-safe partition are verified.

Step 604, data of the boot-safe partition is verified.

Step 606, the files of the system-safe partition are written into a corresponding patch file.

Step 608, the data of the boot-unsafe partition is written into a corresponding patch file.

Figure 7:
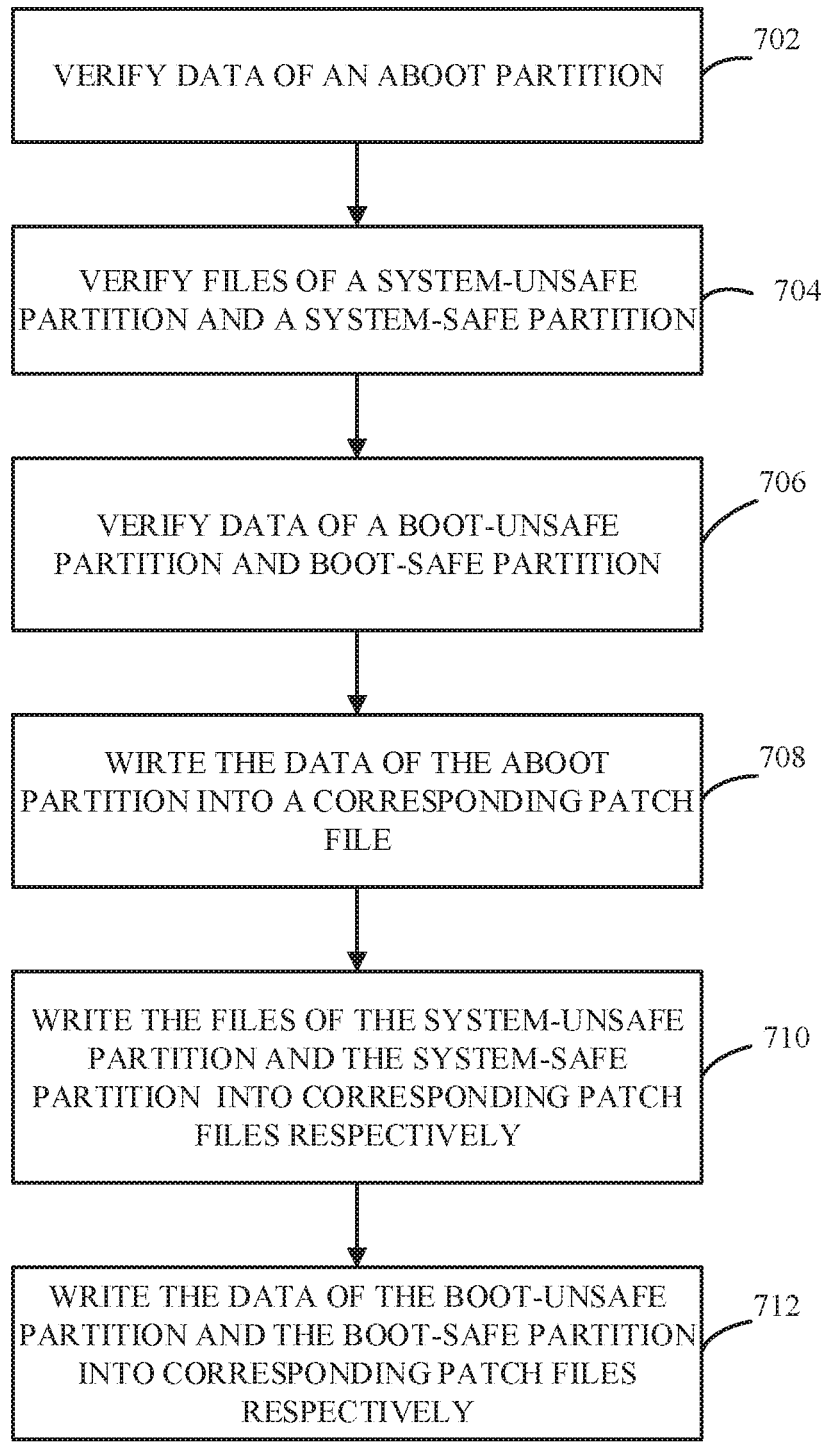
FIG. 7 is a schematic flow chart of a method for updating a normal system and a safe system simultaneously in accordance with an implementation of the present disclosure.

Wherein, a method for updating the normal system and the safe system simultaneously is illustrated by FIG. 7.

As illustrated by FIG. 7, the updating method for updating the normal system and the safe system simultaneously in accordance with an implementation of the present disclosure includes following.

Step 702, data of the aboot partition is verified.

Step 704, files of the system-unsafe partition and the system-safe partition are verified.

Step 706, data of the boot-unsafe partition and the boot-safe partition is verified.

Step 708, the data of the aboot partition is written into a corresponding patch file.

Step 710, the files of the system-unsafe partition and the system-safe partition are written into corresponding patch files respectively.

Step 712, the data of the boot-unsafe partition and the boot-safe partition is written into corresponding patch files respectively.

Figure 8:
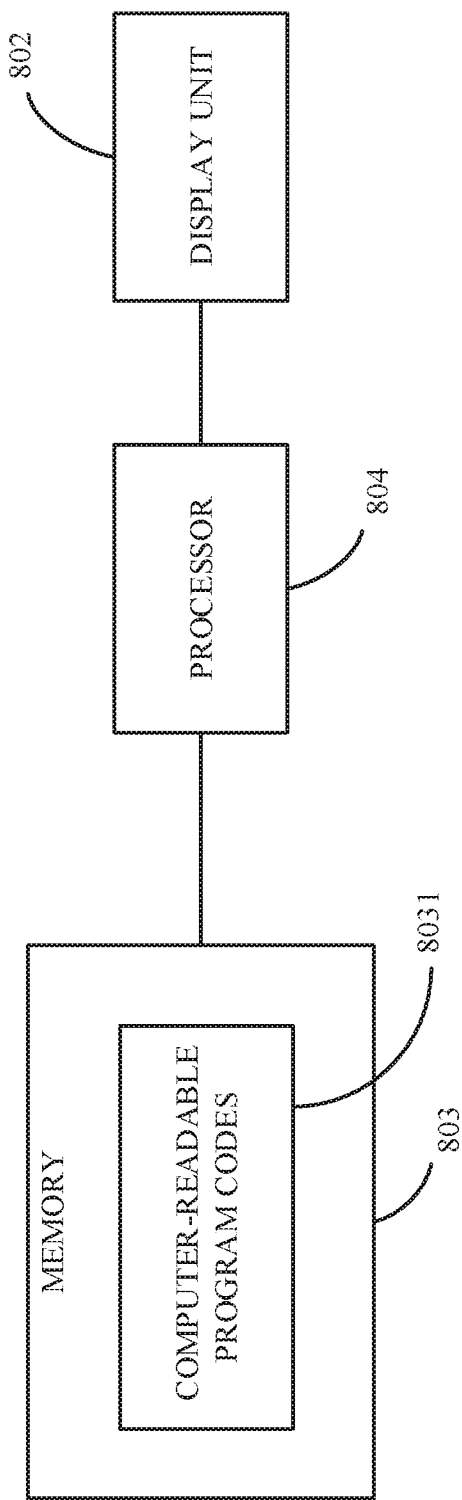
FIG. 8 is a diagrammatic view of a multi-system terminal in accordance with an implementation of the present disclosure.

FIG. 8 is a diagrammatic view of a multi-system terminal in accordance with an implementation of the present disclosure. The terminal can include but not limited to a display unit 802, a memory 803, and a processor 804. The display unit 802 and the memory 803 are electrically coupled to the processor 804.

The display unit 802 is configured to display visual information, such as text, image, for example. The display unit 802 may be a light emitting diode (LED) display screen or an organic light emitting diode (OLED) display screen.

The memory 803 is configured to store a plurality of computer-readable program codes 8031. The memory 803 can be a read only memory (ROM), a random access memory (RAM), a U-disk, a removable hard disk, etc.

The processor 804 can include multiple cores for multi-thread or parallel processing. In this implementation, the processor 804 is configured to execute the plurality of computer-readable program codes 8031 to perform following operations: during a process of creating a system updating file of the multi-system terminal, detecting whether data of a plurality of file partitions specified in the system updating file has changed; upon detecting that the data of at least one file partition of the plurality of file partitions has changed, establishing an identification file for updating a system corresponding to the at least one file partition in the system updating file; and upon receiving an instruction for updating a system of the multi-system terminal, updating a corresponding system of the multi-system terminal according to the identification file of the system updating file.

In the implementation, the plurality of file partitions includes a partition of a boot program for booting the loading of a kernel of the multi-system terminal. Detecting whether the data of the plurality of file partitions specified in the system updating file has changed, and establishing the identifier file includes: detecting whether the data of the partition of the boot program for booting the loading of the kernel of the multi-system terminal has changed; and establishing the identifier file for updating all systems of the multi-system terminal upon detecting that the data of the partition of the boot program for booting the loading of the kernel of the multi-system terminal has changed.

In the implementation, the plurality of file partitions further include partitions of boot programs each for booting the starting of one of the systems of the multi-system terminal, and system partitions each corresponding to one of the systems; detecting whether the data of the plurality of file partitions specified in the system updating file has changed, and establishing the identifier file comprises: detecting whether the data of the file partitions of the boot programs each for booting the starting of one of the systems of the multi-system terminal has changed, and detecting whether the data of the system partitions each corresponding to one of the systems has changed; and upon detecting that the data of the partition of the boot program for booting the loading of the kernel of the multi-system terminal is unchanged, and detecting that the data of the partition of the boot program for booting the starting of one of the systems of the multi-system terminal has changed, and/or upon detecting that the data of the system partition corresponding to the one of the systems has changed, establishing an identifier file for updating the one of the systems.

In the implementation, upon receiving the instruction for updating a system of the multi-system terminal, the plurality of computer-readable program codes 8031 are further executed by the processor 804 to parse the system updating file to obtain the identifier file of the system updating file.

In the implementation, whether the data of each of the plurality of file partitions has changed is detected by detecting whether each of the plurality of file partitions comprises a file having a specified suffix.

In the implementation, updating one of the systems of the multi-system terminal includes: verifying in the system updating file files of the system partition of the one of the systems, and verifying in the system updating file data of the partition of the boot program for booting the starting of the one of the systems; and after the verification, writing the files of the system partition of the one of the systems in the system updating file and the data of the partition of the boot program for booting the starting of the one of the systems in the system updating file into corresponding file partitions of the multi-system terminal respectively.

In the implementation, the plurality of computer-readable program codes 8031 are further executed by the processor 804 to execute following operations: upon receiving an instruction for starting all of the systems of the multi-system terminal, loading the partitions of the boot programs each for booting the starting of one of the systems of the multi-system terminal via the boot program for booting the loading of the kernel of the multi-system terminal; and parsing scripts of init processes each corresponding to one of the systems via the init processes started by the kernel of the multi-system terminal, so as to create file systems each corresponding to one of the systems, and start system processes each corresponding to one of the systems, thereby realizing loading of the system partitions each corresponding to one of the systems.

In the present disclosure, a machine-readable storage medium is further provided. The storage medium includes a plurality of computer readable program codes. The plurality of computer readable program codes are run in a multi-system terminal to execute the system updating method for a multi-system terminal described above, which will not be specifically described to avoid repetition.

In the technical solution of the present disclosure, during a process of creating the system updating file, whether the data of which file partition has changed is detected, and then a system which needs to be updated is determined according to the file partition the data of which has changed, and a corresponding identifier file is created. The system of the terminal is then updated according to the identifier file of the system updating file. When updating the system, in the system updating file the patch file of the file partition corresponding to the system which needs to be updated is written into a corresponding file partition of the terminal.

The above specifically illustrates the technical solution of the present disclosure in combination with the accompanying drawings. As the pertinent art does not provide a feasible updating solution for a multi-system terminal, the present disclosure provides a new system updating solution for a multi-system terminal. By means of the system updating solution, any system of the multi-system terminal can be updated easily, a high applicability can be obtained, the operation and control is easy, thereby improving efficiency of system updating.

The foregoing descriptions are merely preferred implementations of the present disclosure, but are not intended to limit the present disclosure. For those skilled in the art, various changes and variations can be made according to the present disclosure. Any modifications, equivalent replacements, and improvements within the spirit and principle of the technical solution should fall within the protection scope of the present disclosure.

What is claimed is:

1. A method for system updating for a multi-system terminal, comprising:

during a process of creating a system updating file of the multi-system terminal, detecting whether data of a file partition of file partitions specified in the system updating file has changed;

upon detecting that the data of the file partition of the file partitions has changed, establishing an identification file for updating a system corresponding to the file partition in the system updating file; and upon receiving an instruction for updating a system of the multi-system terminal, updating a corresponding system of the multi-system terminal according to the identification file of the system updating file.

2. The method of claim 1, wherein the file partitions comprise a partition of a boot program for booting a loading of a kernel of the multi-system terminal; and the detecting whether data of a file partition of file partitions specified in the system updating file has changed and the establishing the identifier file comprise:

detecting whether the data of the partition of the boot program for booting the loading of the kernel of the multi-system terminal has changed; and establishing the identifier file for updating all systems of the multi-system terminal upon detecting that the data of the partition of the boot program for booting the loading of the kernel of the multi-system terminal has changed.

3. The method of claim 2, wherein the file partitions further comprise partitions of boot programs, each for booting a starting of one of the systems of the multi-system terminal, and system partitions, each corresponding to one of the systems; and the detecting whether data of a file partition of file partitions specified in the system updating file has changed and the establishing the identifier file comprise:

detecting whether the data of the file partitions of the boot programs, each for booting the starting of one of the systems of the multi-system terminal, has changed, and detecting whether the data of the system partitions, each corresponding to one of the systems, has changed; and upon any of detecting that the data of the partition of the boot program for booting the loading of the kernel of the multi-system terminal is unchanged and the data of the partition of the boot program for booting the starting of one of the systems of the multi-system terminal has changed, and detecting that the data of the system partition corresponding to the one of the systems has changed, establishing an identifier file for updating the one of the systems.

4. The method of claim 1, further comprising:

upon receiving the instruction for updating the system of the multi-system terminal, parsing the system updating file to obtain the identifier file of the system updating file.

5. The method of claim 1, wherein the detecting whether data of a file partition of file partitions specified in the system updating file has changed comprises:

detecting whether each of the file partitions comprises a file having a specified suffix.

6. The method of claim 1, wherein updating one of systems of the multi-system terminal comprises:

verifying, in the system updating file, files of the system partition of the one of the systems, and verifying, in the system updating file, data of the partition of a boot program for booting a starting of the one of the systems; and writing the files of the system partition of the one of the systems in the system updating file and the data of the partition of the boot program for booting the starting of the one of the systems in the system updating file into corresponding file partitions of the multi-system terminal respectively.

7. The method of claim 1, wherein the method further comprises:

upon receiving an instruction for starting all systems of the multi-system terminal, loading partitions of boot programs, each for booting a starting of one of the systems of the multi-system terminal, via a boot program for booting the loading of a kernel of the multi-system terminal; and parsing scripts of init processes, each corresponding to one of the systems, via the init processes started by the kernel of the multi-system terminal to create file systems, each corresponding to one of the systems, and starting system processes, each corresponding to one of the systems, to realize loading of the system partitions each corresponding to one of the systems.

8. A multi-system terminal comprising:
a memory storing computer-readable program codes; and
a processor configured to invoke the computer-readable program codes to execute the following operations to:

during a process of creating a system updating file of the multi-system terminal, detect whether data of file partitions specified in the system updating file has changed;

upon detecting that the data of at least one file partition of the file partitions has changed, establish an identification file for indicating a system or systems corresponding to the at least one file partition; and upon receiving an instruction for updating a system of the multi-system terminal, update the system or systems corresponding to the at least one file partition.

9. The multi-system terminal of claim 8, wherein
the file partitions comprise a partition of a boot program for booting a loading of a kernel of the multi-system terminal; and the computer-readable program codes to detect whether the data of the file partitions specified in the system updating file has changed and to establish the identification file for indicating the system or systems corresponding to the at least one file partition comprise computer-readable program codes to:

detect whether the data of the partition of the boot program for booting the loading of the kernel of the multi-system terminal has changed; and establish the identification file for indicating all systems of the multi-system terminal upon detecting that the data of the partition of the boot program for booting the loading of the kernel of the multi-system terminal has changed.

10. The multi-system terminal of claim 9, wherein
the file partitions further comprise partitions of boot programs each for booting a starting of one of the systems of the multi-system terminal, and system partitions each corresponding to one of the systems; and the computer-readable program codes to detect whether the data of the file partitions specified in the system updating file has changed and to establish the identification file for indicating the system or systems corresponding to the at least one file partition comprise computer-readable program codes to:

detect whether the data of the partitions of the boot programs, each for booting the starting of one of the systems of the multi-system terminal, has changed, and detect whether the data of the system partitions, each corresponding to one of the systems, has changed; and upon detecting that the data of the partition of the boot program for booting the loading of the kernel of the multi-system terminal is unchanged and the data of the partition of the boot program for booting the starting of one of the systems of the multi-system terminal has changed or detecting that the data of the system partition corresponding to the one of the systems has changed, establish the identification file for updating the one of the systems.

11. The multi-system terminal of claim 8, the memory comprises further computer-readable program codes to:

upon receiving the instruction for updating the system of the multi-system terminal, parse the system updating file to obtain the identification file of the system updating file.

12. The multi-system terminal of claim 8, wherein the computer-readable program codes to detect whether the data of the file partitions specified in the system updating file has changed comprises computer-readable program codes to:

detect whether each of the file partitions comprises a file having a specified suffix.

13. The multi-system terminal of claim 10, wherein the computer-readable program codes to update the system or systems corresponding to the at least one file partition comprise computer-readable program codes to:

verify, in the system updating file, files of the system partition of the one of the systems, and verify, in the system updating file, data of the partition of a boot program for booting a starting of the one of the systems; and write the files of the system partition of the one of the systems in the system updating file and the data of the partition of the boot program for booting the starting of the one of the systems in the system updating file into corresponding file partitions of the multi-system terminal respectively.

14. The multi-system terminal of claim 8, wherein the memory comprises further computer-readable program codes to:

upon receiving an instruction for starting all systems of the multi-system terminal, load partitions of boot programs, each for booting a starting of one of the systems of the multi-system terminal, via a boot program for booting the loading of a kernel of the multi-system terminal; and parse scripts of init processes, each corresponding to one of the systems, via the init processes started by the kernel of the multi-system terminal to create file systems, each corresponding to one of the systems, and start system processes, each corresponding to one of the systems, to realize loading of the system partitions, each corresponding to one of the systems.

15. A non-transitory machine-readable storage medium storing computer-readable program codes, the computer-readable program codes being invoked by a multi-system terminal having independently bootable system partitions to execute the following operations:

during a process of creating a system updating file of the multi-system terminal, detect whether data of file partitions specified in the system updating file has changed;

upon detecting that the data of at least one file partition has changed, establish an identification file indicating a system or systems corresponding to the at least one file partition; and upon receiving an instruction for updating the multi-system terminal, update the system or systems according to the identification file.

16. The non-transitory machine-readable storage medium of claim 15, wherein the file partitions comprise a partition of a boot program for booting a loading of a kernel of the multi-system terminal; and the computer-readable program codes to detect whether the data of the file partitions specified in the system updating file has changed and the establishing the identifier file comprise computer-readable program codes to:

detect whether the data of the partition of the boot program for booting the loading of the kernel of the multi-system terminal has changed; and establishing the identification file for updating all systems of the multi-system terminal upon detecting that the data of the partition of the boot program for booting the loading of the kernel of the multi-system terminal has changed.

17. The non-transitory machine-readable storage medium of claim 16, wherein the file partitions further comprise partitions of boot programs each for booting a starting of one of the systems of the multi-system terminal, and system partitions each corresponding to one of the systems; and the computer-readable program codes to detect whether the data of the file partitions specified in the system updating file has changed and the establish the identification file comprise computer-readable program codes to:

detect whether the data of the partitions of the boot programs, each for booting the starting of one of the systems of the multi-system terminal, has changed, and detecting whether the data of the system partitions, each corresponding to one of the systems, has changed; and upon detecting that the data of the partition of the boot program for booting the loading of the kernel of the multi-system terminal is unchanged and the data of the partition of the boot program for booting the starting of one of the systems of the multi-system terminal has changed or detecting that the data of the system partition corresponding to the one of the systems has changed, establish the identification file for updating the one of the systems.

18. The non-transitory machine-readable storage medium of claim 15, wherein the computer-readable program codes are further invoked by the multi-system terminal to execute the following operations:

upon receiving the instruction for updating the system or systems of the multi-system terminal, parse the system updating file to obtain the identification file of the system updating file.

19. The non-transitory machine-readable storage medium of claim 15, wherein the computer-readable program codes to update the multi-system terminal comprises computer-readable program codes to:

verify, in the system updating file, files of a system partition of one of the systems, and verify, in the system updating file, data of a partition of a boot program for booting a starting of the one of the systems; and write the files of the system partition of the one of the systems in the system updating file and the data of the partition of the boot program for booting the starting of the one of the systems in the system updating file into corresponding file partitions of the multi-system terminal respectively.

20. The non-transitory machine-readable storage medium of claim 15, wherein the computer-readable program codes are further invoked by the multi-system terminal to execute following operations:

upon receiving an instruction for starting all systems of the multi-system terminal, load partitions of boot programs, each for booting a starting of one of the systems of the multi-system terminal, via a boot program for booting the loading of a kernel of the multi-system terminal; and parse scripts of init processes, each corresponding to one of the systems, via the init processes started by the kernel of the multi-system terminal to create file systems, each corresponding to one of the systems, and starting system processes, each corresponding to one of the systems, to realize loading of the system partitions each corresponding to one of the systems.

* * * * *